Dec. 24, 1963 J. E. CREIGHTON ETAL 3,115,230
TORQUE RELEASE CLUTCH
Filed Aug. 21, 1961 3 Sheets-Sheet 1
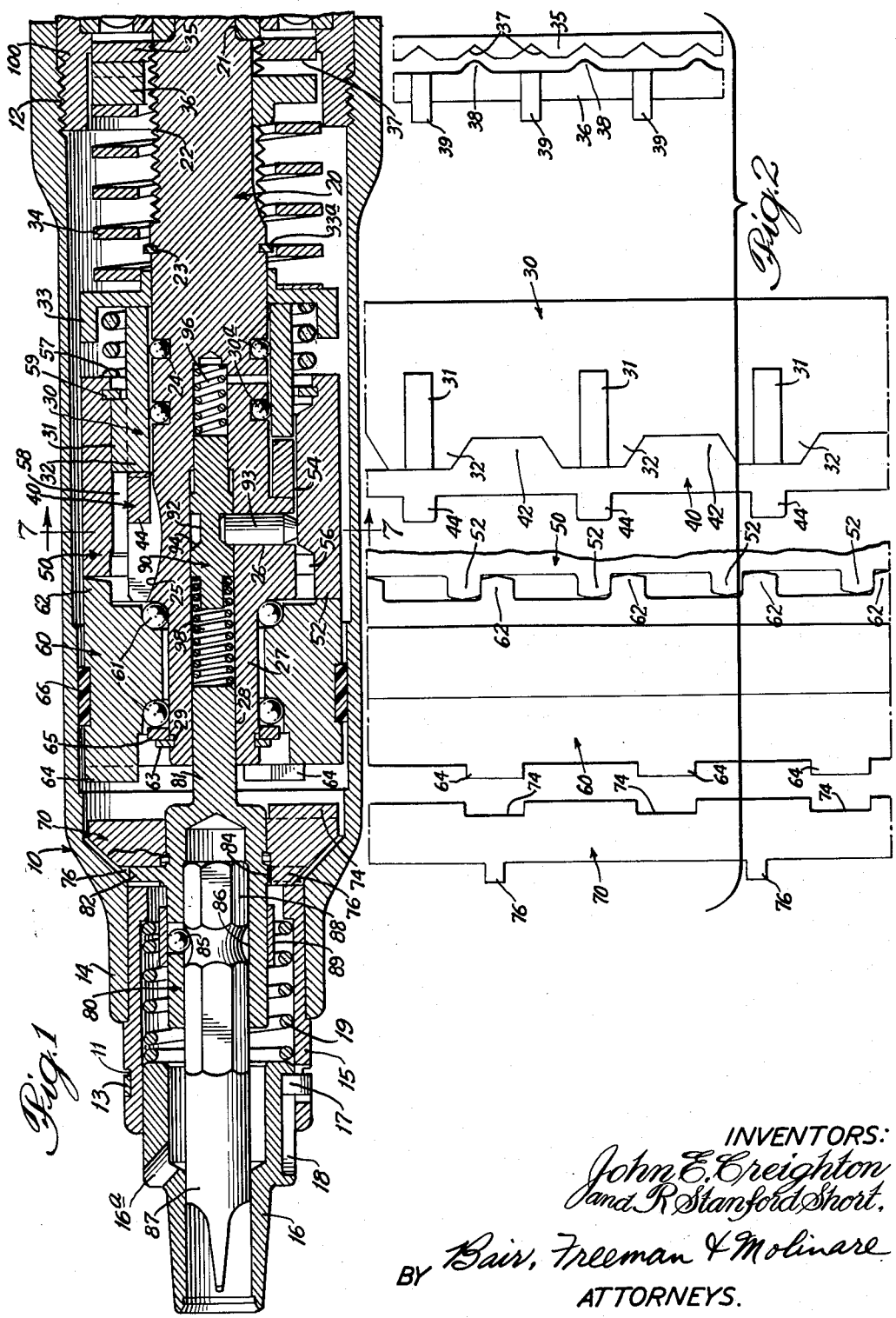
INVENTORS:
John E. Creighton
and R. Stanford Short.
BY Bair, Freeman & Molinare
ATTORNEYS.

Dec. 24, 1963  J. E. CREIGHTON ETAL  3,115,230
TORQUE RELEASE CLUTCH
Filed Aug. 21, 1961  3 Sheets-Sheet 2
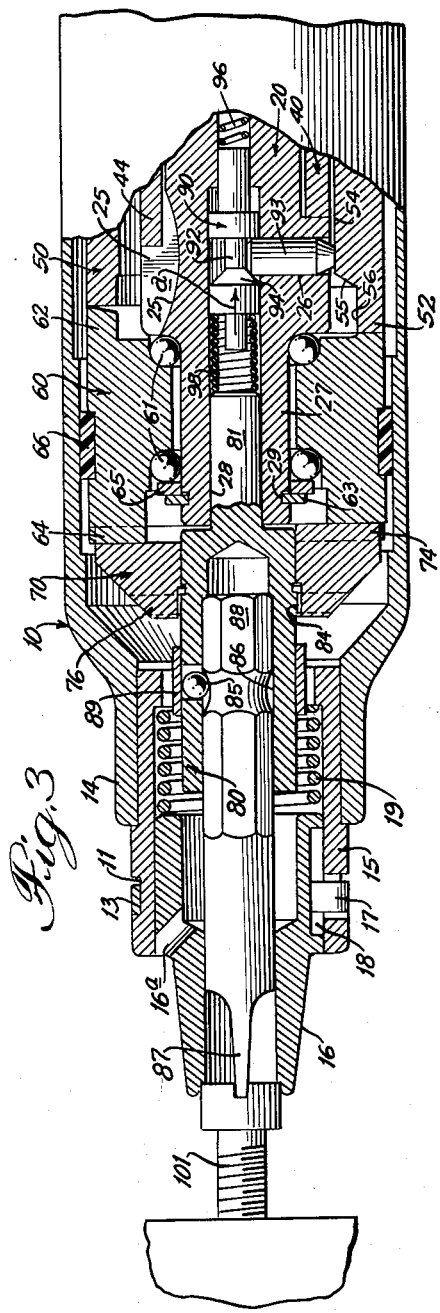
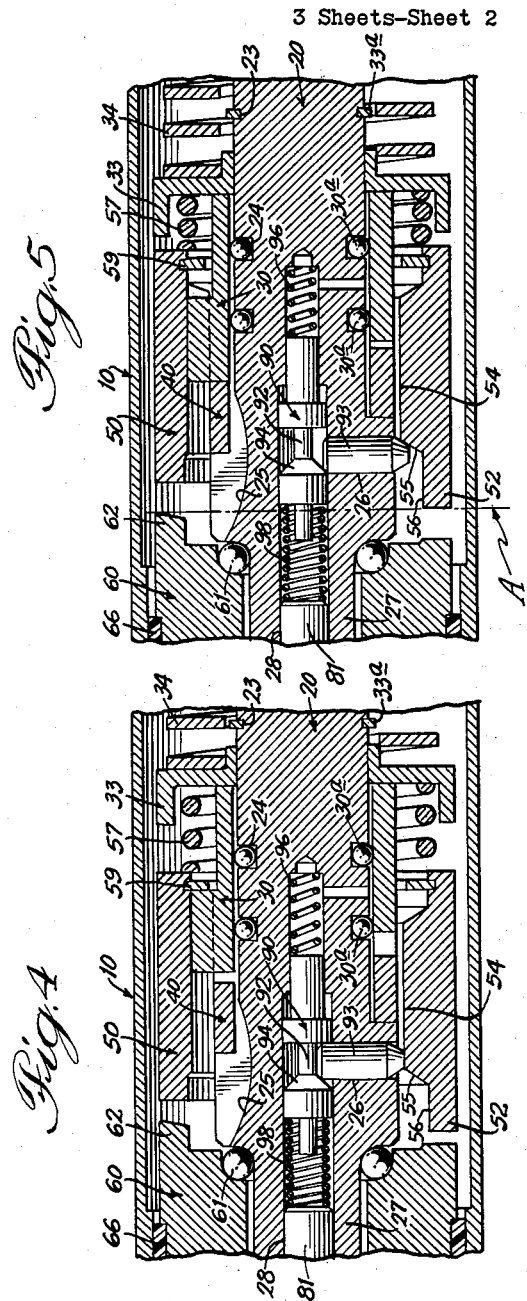
INVENTORS:
John E. Creighton
and R. Stanford Short,
BY Bair, Freeman & Molinare
ATTORNEYS.

Dec. 24, 1963   J. E. CREIGHTON ETAL   3,115,230
TORQUE RELEASE CLUTCH
Filed Aug. 21, 1961   3 Sheets-Sheet 3
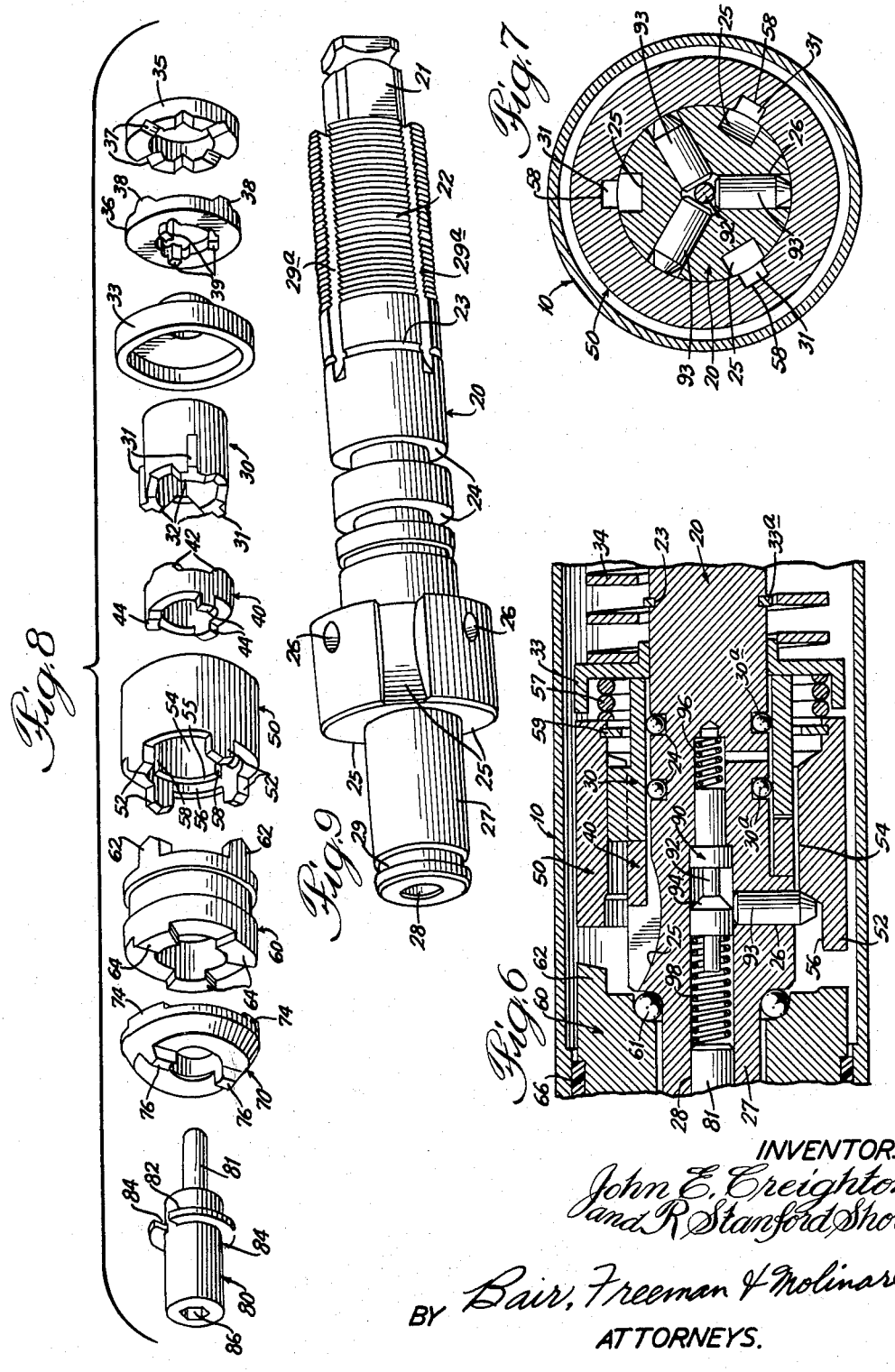
INVENTORS:
John E. Creighton
and R. Stanford Short,
BY Bair, Freeman & Molinare
ATTORNEYS.

United States Patent Office 3,115,230
Patented Dec. 24, 1963

3,115,230
TORQUE RELEASE CLUTCH
John E. Creighton, Chicago, Ill., and R. Stanford Short, Bryan, Ohio, assignors to The Aro Corporation, a corporation of Ohio
Filed Aug. 21, 1961, Ser. No. 132,738
12 Claims. (Cl. 192—56)

This invention relates to a torque release clutch adapted particularly for interposition between a motor and a tool such as a screwdriver or nut runner.

One object of the invention is to provide a torque sensitive clutch for a portable tool which completely disengages in such a manner as to prevent continued application of torque once the predetermined value thereof has been encountered.

Another object is to provide a clutch of the nature referred to which is adjustable to permit selection of the predetermined torque at which disengagement occurs.

Still another object is to provide a clutch of simple construction and of durable nature to minimize maintenance and assure long lasting accuracy.

A further object is to provide a torque release clutch wherein the repositioning of the clutch elements is automatically accomplished within the normal operating sequence of a portable tool, and to produce a clutch of high capacity within minimum size limitations.

Still a further object is to provide a clutch of improved sensitivity to its adjustment means, thereby providing finer adjustment increments; and to provide a clutch adaptable to different tools of similar nature, permitting easy replacement of worn parts or conversion of the clutch components contained in the similar units for different classes of work.

An additional object is to provide a torque release clutch having an automatic operational sequence in which the completion of a nut-runner or the like operation is readily and quickly noted by the operator of the tool, thus effecting the maximum in saving of the operator's time and likewise a maximum production rate in the operation of the tool.

With these and other objects in view, our invention consists in the construction, arrangement and combination of the various parts of our torque release clutch, whereby the objects above contemplated are attained, as hereinafter more fully set forth, pointed out in our claims and illustrated in detail on the accompanying drawings, wherein:

FIG. 1 is an axial cross section through a torque release clutch embodying our invention and showing the parts in normal position;

FIG. 2 is a 360° layout diagram of various interengaging jaws of cams, jaw members and adjusting means of our torque release clutch which are aligned with these same parts shown in FIG. 1;

FIG. 3 is a sectional view somewhat similar to FIG. 1 showing the initial engagement of the tool with the work and the resulting operation of the tool;

FIG. 4 is a similar sectional view showing the first phase of declutching;

FIG. 5 is a similar sectional view showing the parts in the position they assume at the completion of the second phase of declutching due to predetermined resistance to torque having been attained and preceding a free running period before the tool is disengaged from the work;

FIG. 6 is a similar sectional view showing the third phase of declutching with clutch fully disengaged and free-running;

FIG. 7 is a sectional view on the line 7—7 of FIG. 1;

FIG. 8 is an exploded perspective view of some of the elements of our torque release clutch; and FIG. 9 is a perspective view of a spindle thereof.

On the accompanying drawings we have used the following reference numerals to indicate in general the main members of our torque release clutch:

10—housing
20—spindle
30—driven cam
40—driving cam
50—driving jaw member
60—driven jaw member
70—tool connecting jaw member
80—tool holder, and
90—lock out cam Details of the housing 10 are designated with reference numerals 11 to 19, of the spindle with numerals 21 to 29, of the driven cam and associated parts 31 to 39, and so on. The housing 10 may have its right end threaded as indicated at 12 for connection (see FIG. 1) with a motor housing 100 in which is mounted a suitable motor such as one that is pneumatically driven for rotating the spindle 20. Suitable step-down gearing would be provided between the shaft of such motor and the spindle 20 but the motor for driving the spindle and the gearing just referred to form no part of our present invention and accordingly have not been illustrated. The left-hand end of the housing 10 terminates in a hub 14 for supporting the tool holder 80.

A finder adapter 15 is pressed into the bore of the hub 14 and a finder 16 is slidable therein, being limited in its sliding motion and prevented from rotation by a leaf-spring 13 bent to C-shape, located in an annular groove 11 of the finder adapter 15, and having a terminal end 17 extending radially inward and into a slot 18 of the finder 16.

The spindle 20 (see FIG. 9) has a squared driving shank 21 at its right hand end, then a threaded portion 22, a retainer ring groove 23 and a pair of ball gooves 24 in its central part, three slots 25 in an enlarged part with three radial pin bores 26 between the slots 25, a reduced bearing portion 27, a bit holder bore 28 and a retainer ring groove 29 in the portion 27.

The driven cam 30 (see FIG. 8) has three external splines 31 and three projecting cam jaws 32 provided with sloping sides as shown in FIG. 2. At the right hand end of the driven cam 30 we provide a backing washer 33 slidable on the spindle 20 and limited by a retainer ring 33ª in the groove 23 (see FIG. 1). An adjusting nut 35 is threaded on the threads 22 of the spindle, and seated thereagainst is an adjusting lock washer 36, a main spring 34 being interposed between the washers 33 and 36 for biasing the driven cam 30 toward the left. The adjusting nut 35 is provided with notches 37 to coact with teeth 38 of the adjusting lock washer 36 which is provided with three keys 39 slidable in keyways 29ª of the spindle 20. Thus the compression of the spring 34 may be adjusted by rotating the nut 35, and the coacting notches 37 and teeth 38 will retain the adjustment. The driven cam 30 is journaled on the spindle 20, balls 30ª in the grooves 24 being provided for this purpose.

The driving cam 40 is in the nature of a ring having on one end three cam jaws 42 as shown in FIG. 2 provided with sloping sides and coacting with the cam jaws 32 of the driven cam 30. On the other end the driving cam 40 has three axially projecting splines 44 to slide in the slots 25 of the spindle 20. The driving cam 40 is thereby non-rotatably mounted on the spindle 20 to rotate therewith.

The driving jaw member 50 surrounds the driven cam 30 and the driving cam 40, and is provided with jaws 52 on its left end, an internal bore 54 enlarged at 56 as shown in FIG. 1 and three internal slots 58 receiving the three splines 31 of the driven cam 30. A stop ring 59 is seated in an internal groove of the driving jaw 50, and a spring 57 is interposed between the driving jaw and the backing washer 33. The transition from the bore 54 to the enlarged bore 56 constitutes a cam surface 55.

The driven jaw member 60 has jaws 62 on its right hand end to coact with the jaws 52 of the driving jaw member 50 as shown in FIG. 2. It also has jaws 64 on its left hand end. The driven jaw member 60 is journaled on the reduced bearing portion 27 of the spindle 20 by means of two rows of balls 61, and the resulting ball bearing assembly is retained by a retainer ring 63 in the groove 29 between which and the balls a ball race washer 65 is located. A nylon ring 66 surrounds the jaw member 60 and locates it rotationally within the housing 10.

The tool connecting jaw member 70 has jaws 74 on its right hand end to coact with the jaws 64 of the jaw member 60, and on its left hand end has a pair of splines 74 to drivingly coact with notches 84 in a flange 82 of the tool holder 80. The tool holder 80 has a reduced shank 81 slidably entering the bore 28 of the spindle 20 and an other-than-round bore 86 to receive a corresponding head 88 of a tool such as a screwdriver bit 87 projecting slidably and rotatably into the finder 16. A retainer ball 85 and a retainer band 89 of leaf spring type formed C-shape are provided for normally holding the bit 87 to the tool holder 80 yet permit ready removal thereof and replacement with another bit.

The lockout cam 90 is provided with a groove 92 receiving the inner ends of three cam pins 93 located in the radial pin bores 26 of the spindle 20. The groove 92 has a cone-shaped cam surface 94, and is located between a pair of springs 96 and 98 in the bore 28 of the spindle 20, the spring 96 seating in the bottom of the bore and the spring 98 engaging the right hand end of the shank 81 of the tool holder 80. The outer ends of the pins 93 normally contact the bore 54 of the driving jaw 50, as shown in FIG. 1, and during certain phases of the operation of our torque release clutch are slid out as to the position shown in FIG. 6.

*Practical Operation*

FIG. 1 shows our torque release clutch with the parts in the position normally assumed during non-operating intervals. When the operator wants to apply the clutch to a fastener such as a screw 101 shown in FIG. 3 he associates the left hand end of the finder 16 with the head of the screw for properly guiding the screwdriver bit 87 into the slot of the head of the screw, then pushes the entire clutch toward the screw so that the finder 16 recedes relative to the tool against the bias of the spring 19 whereupon the blade of the bit 87 finds the slot of the screw. Obviously other fasteners than the screw 101 may be accommodated by differently designed finders 16 and bits 87 which are readily substituted in the finder adapter 15 and the tool holder 80 in an obvious manner.

Briefly, the operator engages the tool with the fastener to be driven and applies thrust which results in engagement of the tool-connecting jaw member 70 with the driven jaw member 60 as in FIG. 3 to provide a driving relationship between the torque release clutch and the bit 87 accomplished by the jaws 74 inter-engaging with the jaws 64. This thrust compresses the spring 98 behind the tool holder 80 within the spindle 20 which imposes a bias (arrow *a*) toward the right on the lockout cam 90 thereby biasing the three cam pins 93 radially outward but without actually moving them outwardly because they are still confined by the bore 54. The pneumatic motor may be actuated for rotating the spindle 20 prior to, simultaneously with, or following engagement of the tool with the work. The tool is now capable of driving the screw 101 to predetermined torque resistance. Predetermined resistance is established in our torque release clutch and the control for that resistance is built into it, accomplished by the spindle 20 adapted to drive the driving cam 40 through the splines 44 in the slots 25 of the spindle. The driving cam 40 coacts with the driven cam 30 which in turn is biased adjustably by the main spring 34 and related elements (backing washer 33, adjusting nut 35 and adjusting lock nut 36). The splines 31 of the driven cam 30 coact with the internal slots 58 of the driving jaw member 50 in such manner as to permit relative axial movement, the jaws 52 permitting driving engagement with the jaws 62 on the driven jaw member 60 which is mounted on the bearings 61 for permitting free relative rotation between it and the spindle 20.

When the screw 101 approaches properly tightened condition, resistance to turning builds up, tending to cause the bit 87, the jaw members 50 and 60 and the driven cam 30 to remain stationary while the motor continues to drive the spindle 20 and the driving cam 40. Relative rotation induced results in the first phase of declutching, with axial movement of the driven cam 30 in a rearward direction (toward the right) with a slight relative rotation of the cams 30 and 40 as camming is accomplished by the cam jaws 32 and 42, shown separated about half their depth in FIG. 4. These jaws during operation are never separated. To minimize frictional drag between the spindle 20 and the driven cam 30 two rows of the balls 30$^a$ are provided to secure the desired bearing characteristics.

As the driven cam 30 moves rearwardly it engages a shoulder (snap ring 59) and carries with it the driving jaw member 50, thereby moving the jaws 52 to the right in FIG. 2, eventually disengaging the flat sides of the jaws 52 from the flat sides of the jaws 62, after which the jaws 52 and 62 are cammed as a function of their jaw cam angles and further move the driving jaw member 50 rearwardly against the bias of the spring 57 whereby the driving relationship between the two jaw members 50 and 60 is broken or released at the jaws 52 and 62 as shown in FIG. 5. A reference line A shows the tips of the jaws 52 and 62 just clearing each other. The driving jaw member 50 and the driven cam 30 never separate completely since the depth of engagement of their splines 31 and internal slots 58 exceeds the total depth of the jaws 52 and 62 plus any clearance between them during operation. As the jaw members 50 and 60 approach disengagement, the cone-shaped outer ends of the three pins 93 engage the cam surface 55 of the driving jaw member 50 as a result of the spring bias imposed by the spring 98 on the lockout cam 90 which in turn results from thrust upon the fastener 101 being driven. In FIG. 5 these pins are shown about half way outward on the cam surface 55.

The camming action between these pins and the cam surface 55 is such as to further move the driving jaw member 50 rearwardly beyond the point of non-drive of the jaws 52 and 62 and thereby assure clearance which results in "free wheeling" as the clutch continues to rotate. The driving jaw member 50 is then retained in the position of FIG. 6 through the interposition action of the three pins 93 between the perimeter of the lockout cam 90 and the cam surface 55 so long as thrust is maintained against the fastener. Our clutch is proportioned to permit the three pins 93 to ride past the cone-shaped camming surface 94 on the lockout cam 90 and bear on the outside diameter or perimeter of the lockout cam. The pins 93 retain the driving jaw member 50 against a light bias provided by the spring 57 and is independent of the heavy spring bias imposed by the main spring 34. This is an important factor which minimizes clutch wear and minimizes thrust requirements against the fastener to actuate the lockout cam 90. The spring 57 is of a strength only sufficient to assure re-engagement of the driving and driven jaw members 50 and 60 upon release of thrust exerted against the fastener.

Upon release of thrust the following sequence occurs: The spring bias exerted by the spring 98 is relieved and is overpowered by the spring 96 moving the lockout cam 90 to its initial position. The bias of the spring 57 urges the driving jaw member 50 forward and through the cam action between the cam surface 55 and the three pins 93 causes the pins to retract to normal position. As the pins are retracted the driving jaw member 50 moves forward, still under the bias of the spring 57, and re-engages its driving jaws 52 with the driven jaws 62. Obtusely pointed ends on the jaws 52 and 62 assure positive repositioning and complete re-engagement of these jaws with each other. Thus the clutch automatically repositions itself as in FIG. 1 for the next driving sequence, and will repeat the foregoing described cycle upon thrust being exerted against the next fastener to be driven.

There are several detail advantages of the torque release construction disclosed. The backing washer 33 is designed to pilot the inside diameter of the main spring 34 and to pilot the outside diameter of the spindle 20. It also provides a limit stop for rearward movement of the driving jaw member 50 under severe inertia reactions at high speed. The retainer ring 33ª serves as a positive stop ring for the backing washer 33 and to retain the assembly of the clutch mechanism during the changing of adjustment springs 34. The jaws 64 are shown in a preferred design whereby one row of balls 61 absorbs the thrust action rearwardly and the other row of balls 61 absorbs the forward thrust exerted by the spring 57. The parts are assembled and retained in position through the action of the thrust washer 65 and a retainer ring 63. The nylon ring 66 is provided as a bearing to help stabilize the forward end of the torque release clutch. This is not a precision bearing but a very loose fit between the housing 10 and the driven jaw member 60 thereby permitting air pressure to bleed past the fit and avoid air pressure build-up rearward of the torque release clutch. Tools of this general type usually permit leakage of quantities of air to bleed through the gear train and unless vented would have adverse effects upon the screw-driving clutch components.

At high speed the operation may be somewhat different than that thus far described due to acceleration forces resulting from the cam reactions and the inertia of the clutch components. Under these circumstances the camming action as between the jaws 32 and 42 is so severe that the jaws 52 are so quickly disengaged from the jaws 62 that the camming ends of these jaws are separated before they can interact. Also the action is so rapid that the pins 93 and the cam surface 55 likewise do not have a chance to interact, and complete declutching is accomplished and the jaws cleared of the jaws 52 as a result of the cam action between only the jaws 32 and 42.

At somewhat lower speeds the cam ends of the jaws 52 and 62 interact to cause their separation from each other but the pins 93 and cam surface 55 do not have a chance to interact. At the high and somewhat lower speeds mentioned however, the pins 93 still perform the function of preventing re-engagement of the jaws 52 with the jaws 62, by reason of the pins constituting an obstruction in the path of the cam surface 55, until such time as the tool is removed from the work.

While speed has been cited as the consideration for modified action of the tool as described in the last two paragraphs, the character of the work is also a modifying factor. For instance, when tightening a screw against a gasket, the resiliency of the gasket tends to reduce the effect of speed.

Some changes may be made in the construction and other details of our torque release clutch without departing from the real spirit and purpose of our invention. It is accordingly our intention to cover by our claims any modified forms of structure or use of mechanical equivalents which may reasonably be included within their scope.

We claim as our invention:

1. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, means to limit the sliding motion thereof in one direction relative thereto, a driven jaw member rotatable on said spindle, said jaw members having coacting jaws projecting toward and normally meshed with each other, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having an enlarged inside surface for retaining said cam pin when cammed outwardly by said lockout cam, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member, and a spring interposed between said torque determining spring and said driving jaw member against the bias of which said driving jaw member is cammed axially of said driven cam by said cam pin to completely disengage said coacting jaws of said driving and driven jaw members and permit free rotation of said spindle, driving cam, driven cam and driving jaw member.

2. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, means to limit the sliding motion thereof in one direction relative thereto, a driven jaw member rotatable on said spindle, said jaw members having coacting jaws projecting toward and normally meshed with each other, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having a cone-shaped cam with which said cam pin coacts to effect axial movement of said driving jaw member as a result of outward movement of said cam pin, an enlarged inside surface for retaining said cam pin when cammed outwardly by said lockout cam, one of said pair of springs being compressed by said tool holder shank when moved into said bore by engagement of the tool with a fastener or the like and thereby operable upon expansion to move said lockout cam, to effect such outward movement of said cam pin when said driven cam has been cammed against the bias of said torque determining spring by reason of predetermined resistance to torque offered by the fastener to effect release of said driven jaw member from said driving jaw member, and a spring interposed between said torque determining spring and said driving jaw member against the bias of which said driving jaw member is cammed axially of said driven cam by said cam pin to completely disengage said coacting jaws of said driving and driven jaw members and permit free rotation of said spindle, driving cam, driven cam and driving jaw member.

3. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, a driven jaw member rotatable on said spindle, said jaw members having coacting jaws projecting toward and normally meshed with each other, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having an enlarged inside surface for retaining said cam pin when cammed outward by said lockout cam, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member, and a spring interposed between said torque determining spring and said driving jaw member.

4. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, a driven jaw member rotatable on said spindle, said jaw members having coacting jaws projecting toward and normally meshed with each other, said driven jaw member having a second jaw, a tool holder having a shank, said spindle having a bore into one end thereof rotatably and slidably receiving said shank, a tool connecting jaw member carried by said tool holder and having a jaw to at times coact with said second jaw of said driven jaw member, a lockout cam slidable in said bore on said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having cam means with which said cam pin coacts to effect axial movement of said driving jaw member as a result of outward movement of said cam pin, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member, and a spring interposed between said torque determining spring and said driving jaw member.

5. In a torque release clutch, a rotatable driving spindle, a driving cam rotatable therewith, a driven cam rotatable and axially slidable on said spindle, a torque determining spring on said spindle and biasing said driven cam axially thereof into engagement with said driving cam, said cams having interengaging cam jaws projecting axially toward each other and provided with inclined sides tending to separate said cams under torque, a driving jaw member non-rotatably and axially slidable relative to said driven cam, means to limit the sliding motion thereof in one direction relative thereto, a driven jaw member rotatable on said spindle, said jaw members having coacting jaws projecting toward and normally meshed with each other, said jaws having axially extending sides terminating in shallow V points, said driven jaw member having a second jaw, a tool holder having a shank, said spindle having a bore into one end thereof rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, and a cam pin slidable therein, said lockout cam having cam means for said cam pin, said cam pin being normally aligned with the inside surface of said driving jaw member, said driving jaw member having an enlarged inside surface for said cam pin when cammed outward by said lockout cam, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member and thereby space apart said coacting jaws of said jaw members.

6. In a torque release clutch, a rotatable driving spindle, a driving cam rotatable therewith, a driven cam rotatable and axially slidable on said spindle, a torque determining spring on said spindle and biasing said driven cam axially thereof into engagement with said driving cam, said cams having interengaging cam jaws projecting axially toward each other and provided with inclined sides tending to separate said cam under torque, a driving jaw member non-rotatably and axially slidable relative to said driven cam, means to limit the sliding motion thereof in one direction relative thereto, a driven jaw member rotatable on said spindle, said jaw members having coacting jaws projecting toward and normally meshed with each other, said jaws having axially extending sides terminating in shallow V points, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, and a cam pin slidable therein, said lockout cam having cam means for said cam pin, said cam pin being normally aligned with the inside surface of said driving jaw member, said driving jaw member having cam means with which said cam pin coacts for axial movement of said driving jaw member resulting from radially outward movement of said cam pin produced by axial movement of said lockout cam, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member and thereby space apart said coacting jaws of said jaw members.

7. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, means to limit the sliding motion thereof in one direction relative thereto, a driven jaw member rotatable on said spindle, said jaw members having coacting jaws projecting toward and normally meshed with each other, said driven jaw member having a second jaw, a tool holder having a shank, said spindle having a bore into one end thereof which rotatably and slidably receives said shank, a tool connecting jaw member carried by said tool holder and having a jaw to at times coact with said second jaw of said driven jaw member, a lockout cam slidable in said bore of said spindle, said spindle having a radial bore, a cam pin slidable therein, spring means normally preventing such coaction but permitting the same when thrust is applied to said torque release clutch in a direction to engage a tool held in said tool holder with a fastener or the like to be rotatably driven to fastening position, the jaws of said driven and driving jaw members being operable to effect release of said driven jaw member from said driving jaw member, and a spring interposed between said torque determining spring and said driving jaw member against the bias of which said driving jaw member is cammed axially of said driven cam by said cam pin to completely disengage said coacting jaws of said driving and driven jaw members and permit free rotation of said spindle, driving cam, driven cam and driving jaw member.

8. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having inter-engaging cam jaws projecting axially toward each other and provided with inclined sides tending to separate said cams under torque, a driving jaw member non-rotatable and axially slidable on said driven cam, a driven jaw member rotatable on said spindle, said jaw members having coacting jaws projecting toward and normally meshed with each other, said driven jaw member having a second jaw, a tool holder having a shank, said spindle having a bore rotatably and slidably receiving said shank, a tool connecting jaw member carried by said tool holder and having a jaw to at times coact with said second jaw of said driven jaw member, spring means normally preventing such coaction but permitting the same when thrust is applied to said torque release clutch in a direction to engage a tool held in said tool holder with a fastener or the like to be rotatably driven to fastening position, the jaws of said driven and driving jaw members having inclined cooperating faces operable to effect release of said driven jaw member from said driving jaw member, and a spring interposed between said torque determining spring and said driving jaw member against the bias of which said driving jaw member is cammed axially of said driven cam to completely disengage said coacting jaws of said driving and driven jaw members and permit free rotation of said spindle, driving cam, driven cam and driving jaw member.

9. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having interengaging cam jaws projecting axially toward each other and provided with inclined sides tending to separate said cams under torque, a driving jaw member non-rotatably and axially slidable on said driven cam, a driven jaw member rotatable on said spindle, said jaw members having coacting jaws projecting toward and normally meshed with each other, said driven jaw member having a second jaw, a tool holder having a shank, said spindle having a bore rotatably and slidably receiving said shank, a tool connecting jaw member carried by said tool holder and having a jaw to at times coact with said second jaw of said driven jaw member, a spring and a lockout cam slidable in said bore of said spindle, said spindle having a radial bore, a cam pin slidable therein, said lockout cam having cam means for said cam pin, said cam pin being normally aligned with the inside surface of said driving jaw member, said driving jaw member having an enlarged part, the transition from said inside surface to said enlarged part constituting a shoulder across which said cam pin extends to retain said driving jaw member against axial movement after said driving jaw member has been moved axially by said cam pin, and thereby in disengaged position relative to said driven jaw member, a second spring in said bore of said spindle, said lockout cam being mounted between the two springs in said bore, said tool holder shank being operable through said first spring to move said lockout cam against the action of said second spring to a position to effect such outward movement of said cam pin when said driven cam has been cammed against the bias of said torque determining spring by reason of predetermined resistance to torque offered by the fastener to effect release of said driven jaw member from said driving jaw member and thereby space apart said coacting jaws of said jaw members.

10. In a torque release clutch, a rotatable driving spindle, a driving cam rotatable therewith, a driven cam rotatable and axially slidable on said spindle, a torque determining spring on said spindle and biasing said driven cam axially thereof into engagement with said driving cam, an adjusting nut threaded on said spindle for varying the effect of said torque determining spring on said driven cam, said cams having interengaging cam jaws projecting axially toward each other and provided with inclined sides tending to separate said cams under torque, a driving jaw member non-rotatable and axially slidable on said driven cam, a driven jaw member rotatable on said spindle, said jaw members having coacting jaws projecting toward and normally meshed with each other, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having an enlarged inside retainer surface for said cam pin when cammed outwardly by said lockout cam, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring by reason of predetermined resistance to torque offered by the fastener to effect release of said driven jaw member from said driving jaw member and thereby space apart said coacting jaws of said jaw members, a spring interposed between said torque determining spring and said driving jaw member against the bias of which said driving jaw member is cammed axially of said driven cam by said cam pin to completely disengage said coacting jaws of said driving and driven jaw members and permit free rotation of said spindle, driving cam, driven cam and driving jaw member, a housing enclosing the foregoing recited elements, and a support bearing surrounding said driven jaw member and loosely fitting the inner diameter of said housing.

11. In a torque release clutch, a rotatable driving spindle, a driving cam rotatable therewith, a driven cam, a torque determining spring on said spindle and biasing said driven cam axially thereof into engagement with said driving cam, said cams having interengaging cam jaws projecting axially toward each other and provided with inclined sides tending to separate said cams under torque, a driving jaw member independent of said driven cam and non-rotatable and axially slidable thereon, a driven jaw member, said jaw members having coacting jaws projecting toward and normally meshed with each other, said driven jaw member having a second jaw, a tool holder having a shank, said spindle having a socket-like bore rotatably and slidably receiving said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for camming said cam pin outwardly, said cam pin being normally aligned with the inside surface of said driving jaw member, said driving jaw member having an enlarged inside retainer surface for said cam pin upon outward movement thereof, one of said pair of springs being compressed by said tool holder shank when moved into said bore by engagement of the tool with a fastener or the like and thereby operable upon expansion to move said lockout cam to effect such outward movement of said cam pin when said driven cam has been cammed against the bias of said torque determining spring to effect release of said driven jaw member from said driving jaw member and thereby space apart said coacting jaws of said jaw members, a spring interposed between said torque determining spring by reason of predetermined resistance to torque offered by the fastener and said driving jaw member against the bias of which said driving jaw member is cammed axially of said driven cam by said cam pin to completely disengage said coacting jaws of said driving and driven jaw members and permit free rotation of said spindle, driving cam, driven cam and driving jaw member, and a housing enclosing the foregoing recited elements.

12. In a torque release clutch, a rotatable driving spindle, a driving cam non-rotatable relative thereto, a driven cam rotatable and axially slidable on said spindle, a torque determining spring on said spindle and biasing said driven cam axially thereof into engagement with said driving cam, said cams having interengaging cam jaws projecting axially toward each other and provided with inclined sides tending to separate said cams under torque, a driving jaw member non-rotatably and axially slidable on said driven cam, a driven jaw member rotatable on said spindle, said jaw members having coacting jaws projecting toward and normally meshed with each other, said driven jaw member having a second jaw, a tool holder having a shank, said spindle having a bore extending into one end thereof which rotatably and slidably receives said shank, a tool connecting jaw member carried by said tool holder and having a jaw to at times coact with said second jaw of said driven jaw member, a lockout cam slidable in said bore of said spindle, a pair of springs in said bore at opposite ends of said lockout cam, said lockout cam and said pair of springs being interposed between the bottom of said bore and said tool holder shank and constituting means normally preventing such coaction but permitting the same when thrust is applied to said torque release clutch in a direction to engage a tool held in said tool holder with a fastener or the like to be rotatably driven to fastening position, said spindle having a radial bore, a cam pin slidable therein, said lockout cam having cam means for said cam pin, said cam pin being normally aligned with the inside surface of said driving jaw member, said driving jaw member having an enlarged inside surface for said cam pin when cammed outward by said lockout cam, a second spring in said bore of said spindle, said lockout cam being mounted between the two springs in said bore, said tool holder shank being operable through said first spring to move said lockout cam against the action of said second spring to a position to effect such outward movement of said cam pin when said driven cam has been cammed against the bias of said torque determining spring by engagement of a tool held in said tool holder with a fastener or the like and upon rotation of said tool holder until resistance to torque is offered by said fastener to effect release of said driven jaw member from said driving jaw member and thereby space apart said coacting jaws of said jaw members, and a spring interposed between said torque determining spring and said driving jaw member against the bias of which said driving jaw member is cammed by said cam pin to disengage said co-acting jaws of said driving and driven jaw members.

References Cited in the file of this patent

UNITED STATES PATENTS

| | | |
|---|---|---|
| 2,765,059 | Amtsberg | Oct. 2, 1956 |
| 2,881,888 | Amtsberg | Apr. 14, 1959 |
| 3,034,623 | Amtsberg | May 15, 1962 |